(12) United States Patent
Brönnimann et al.

(10) Patent No.: US 8,015,681 B2
(45) Date of Patent: Sep. 13, 2011

(54) PRESSING DEVICE

(75) Inventors: Martin Brönnimann, Itingen (CH);
David Gerber, Büren (CH)

(73) Assignee: Rego-Fix AG, Tenniken (CH)

( * ) Notice: Subject to any disclaimer, the term of this patent is extended or adjusted under 35 U.S.C. 154(b) by 382 days.

(21) Appl. No.: 12/409,627

(22) Filed: Mar. 24, 2009

(65) Prior Publication Data

US 2010/0071184 A1    Mar. 25, 2010

(30) Foreign Application Priority Data

Mar. 25, 2008   (CH) .......................... 434/08

(51) Int. Cl.
*B23P 19/04* (2006.01)
*B23Q 3/12* (2006.01)
(52) U.S. Cl. .............................. 29/235; 29/281.1; 29/283
(58) Field of Classification Search ................ 29/235, 29/237, 238, 252, 281.1, 283, 283.5
See application file for complete search history.

(56) References Cited

U.S. PATENT DOCUMENTS

| | | | |
|---|---|---|---|
| 3,691,604 A * | 9/1972 | Spontelli | 29/237 |
| 6,694,586 B1 * | 2/2004 | Goop | 29/234 |
| 7,506,580 B2 * | 3/2009 | Bronnimann | 100/269.01 |
| 2006/0059677 A1 * | 3/2006 | McKay | 29/516 |

FOREIGN PATENT DOCUMENTS

EP    1862715 A1    12/2007

* cited by examiner

*Primary Examiner* — David B Thomas
(74) *Attorney, Agent, or Firm* — Hammer & Associates, P.C.

(57) ABSTRACT

Pressing device for relative axial displacement of two parts arranged coaxially with one another and displaceable towards one another only by means of high pressure, such as, for example, collet chucks or clamping sleeves, into corresponding bores of tool or collet chuck holders. The device has an outer housing which coaxially encompasses the parts to be pressed and is hinged along an axial plane. Insert halves which in each case comprise two fixed plates having engaging edges for engaging one of the parts to be pressed and an axially moveable press plate having an engaging edge for engaging the second part to be pressed can be inserted into the housing.

2 Claims, 3 Drawing Sheets

PRESSING DEVICE

FIELD OF THE INVENTION

The present invention relates to a pressing device for relative axial displacement of two parts arranged coaxially with one another and displaceable towards one another only by means of high pressure, comprising a housing, a press plate displaceable axially in the interior of the housing, a number of pressure cylinders arranged in an annular manner at equal angular spacings and intended for axial displacement of the press plate, an insert having coaxial annular engaging edges for engaging the parts to be pressed.

BACKGROUND OF THE INVENTION

Pressing processes of this type are used, for example, in the pressing of pipe ends or shaft connections. High pressure is required because the friction of a tight fit has to be overcome and in many cases additional material deformation must be effected. A typical example is the pressing in and pressing out of collet chucks or clamping sleeves in corresponding tool holders or collet chuck holders for machine tools.

For certain embodiments of tool receptacles, in particular those having little or no conicity of collet chuck and receptacle cone, as are preferred for machines with very high speeds, the collet chucks or clamping sleeves with the inserted tool shaft cannot readily be inserted into the receptacle of the collet chuck holder and fixed with a clamping nut or, conversely, removed again after loosening of the clamping nut but must be pressed in and also pressed out again with high pressure. There are various solutions for this pressing in and pressing out but they are associated with disadvantages.

A pressing device which performs these tasks is described in Swiss Patent No. 896/06. To avoid requiring a complete pressing device for each different tool size, the tool receptacles are designed as changeable inserts which can be inserted into a corresponding recess in a housing. These inserts consist of lower and upper fixed plates and press plates displaceable in between by rams. The fixed plates and the displaceable press plates have engaging edges for placing on corresponding grooves or flanges on the parts to be pressed.

A disadvantage of this arrangement is that the inserts with the rams are relatively complicated to produce and therefore expensive.

OBJECTS OF THE INVENTION

It is therefore the object of the invention to provide a pressing device which completely performs the function of the solution described above but is easier and hence more economical to construct.

SUMMARY OF THE INVENTION

According to the invention this object is achieved by a pressing device of the type mentioned at the outset, which is distinguished in that the insert consists of two half-shells which when assembled form a substantially cylindrical shape and which in turn consist of three coaxial parts which are annular when assembled and on the insides of which said engaging edges are formed and the outsides of which are provided with all-round ribs which engage annular grooves on the housing and on the press plate.

DESCRIPTION OF THE FIGURES

Below, a pressing-in and pressing-out device for flat-cone collet chucks is described as a preferred embodiment of the invention with reference to the attached drawings.

DESCRIPTION OF THE INVENTION

Figure 1:
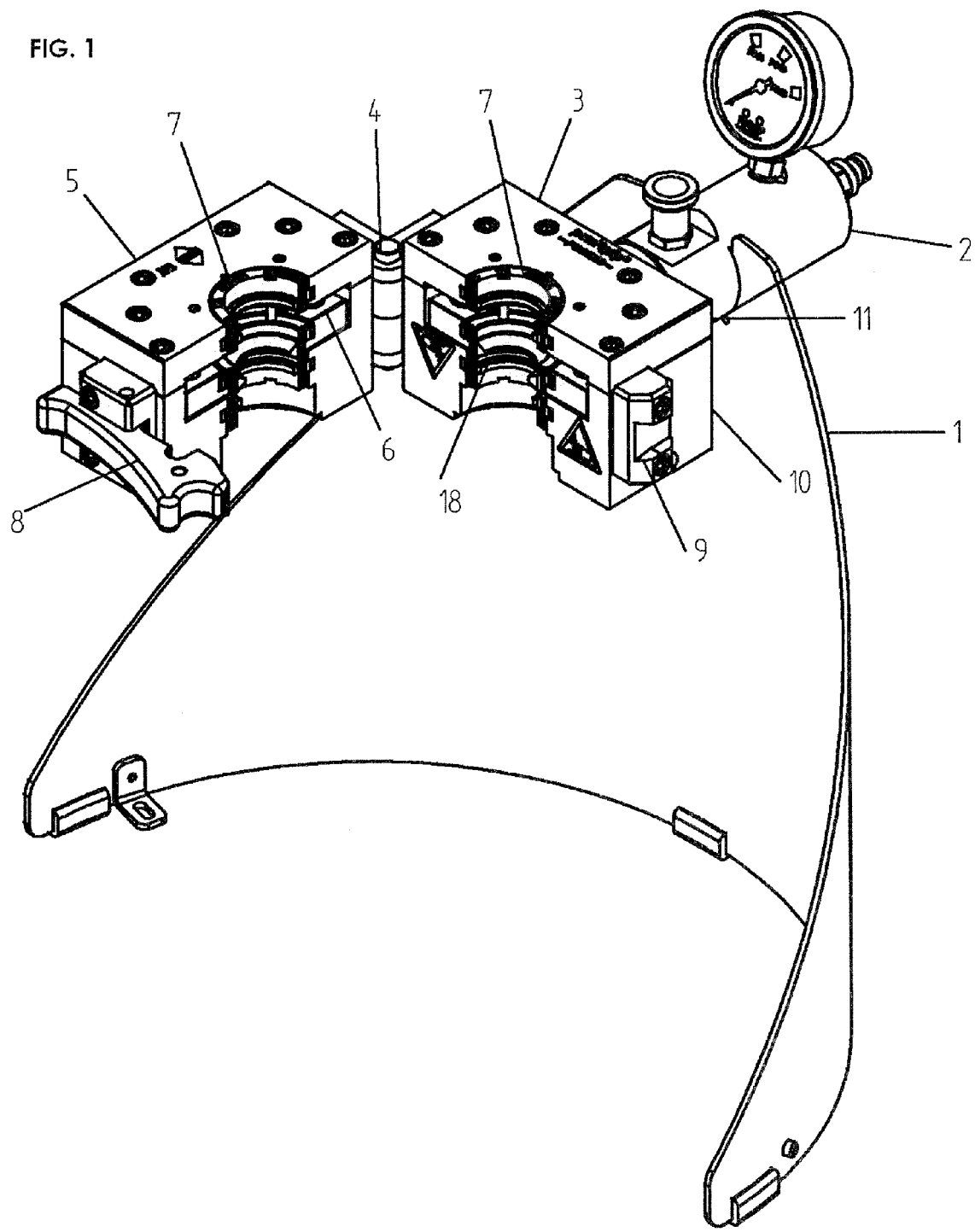
FIG. 1 shows a perspective diagram of a pressing device in the open state

In the following description of the working example shown in the drawings, mention of details which are known from the relevant prior art is dispensed with. Reference is expressly made to the descriptions in Swiss Patent No. 896/06.

FIG. 1 shows the substantial parts of a pressing device which is arranged on a stand 1 by means of a rotary holder 2. The pressing device has a divisable housing comprising a fixed housing half 3 and a housing half 5 which can be pivoted outwards. The two housing halves are connected to one another by a hinge 4. The housing half which can be pivoted outwards is equipped with a locking device 8 which, in the closed state, engages a corresponding counterpart 9 on the fixed housing half.

Figure 2:
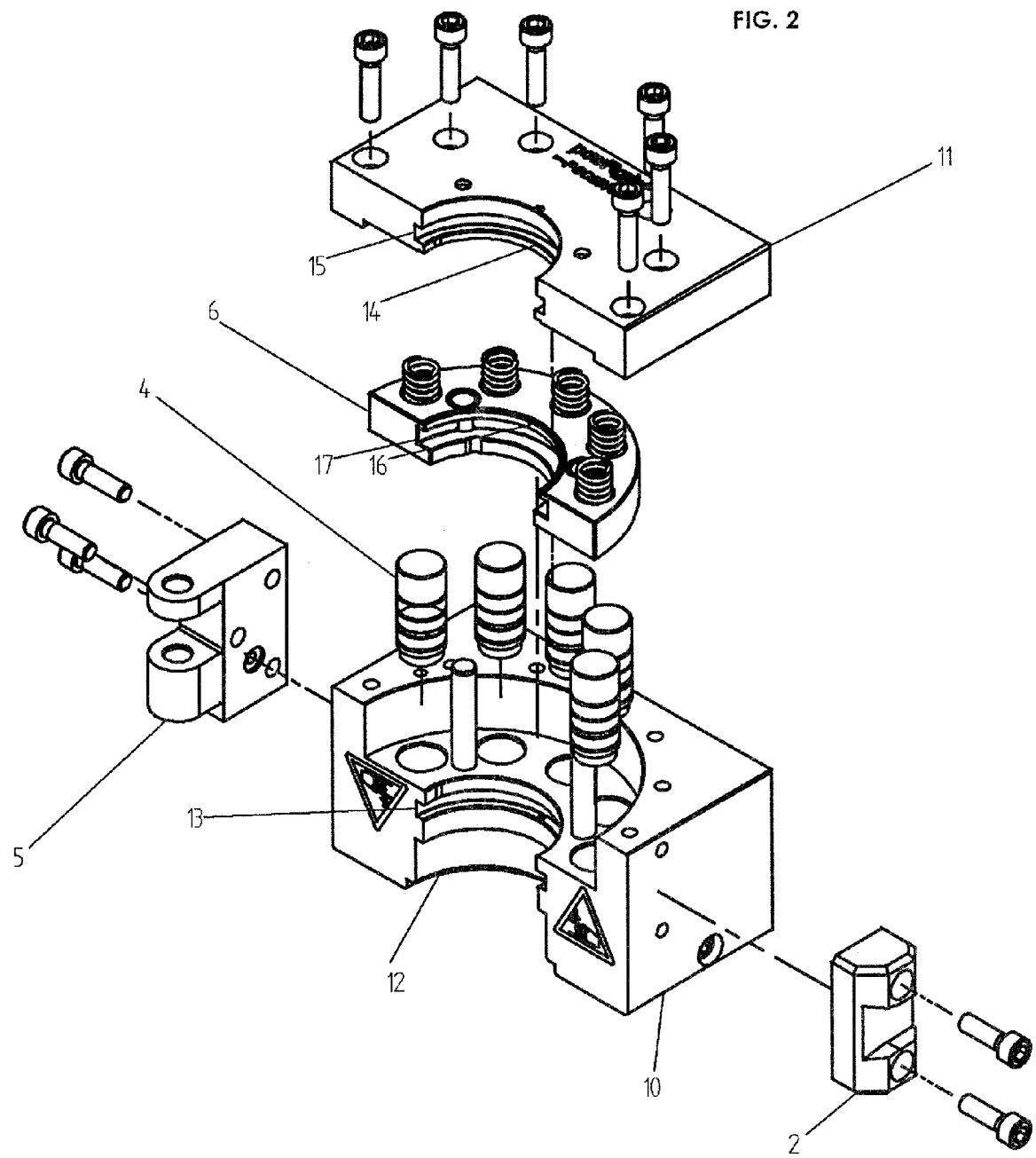
FIG. 2 shows a corresponding diagram of the outer housing of a pressing device without inserted insert

FIG. 2 shows a housing half on a larger scale. It consists of a lower part 10 and a cover 11 screwed to it, between which is formed an interior in which one half of an axially displaceable press plate 6 is arranged. As is known from the prior art, the press plate halves are held in a rest position by spring elements and are moved axially by rams and pressure cylinders.

The lower part 10 is provided with a coaxial, semicircular or semi cylindrical recess 12, in the inner surface of which a groove 13 runs. In the same way, both the cover 11 is provided with a corresponding recess 14 and a groove 15 running in its inner surface and the press plate half 6 is provided with a corresponding recess 16 and a groove 17 running in its inner surface. In the closed housing, the grooves form all-round annular grooves with the corresponding grooves on the other housing half. The recesses, 12, 14, 16 with the grooves 13, 15, 17 serve for receiving correspondingly shaped insert halves.

Figure 3:
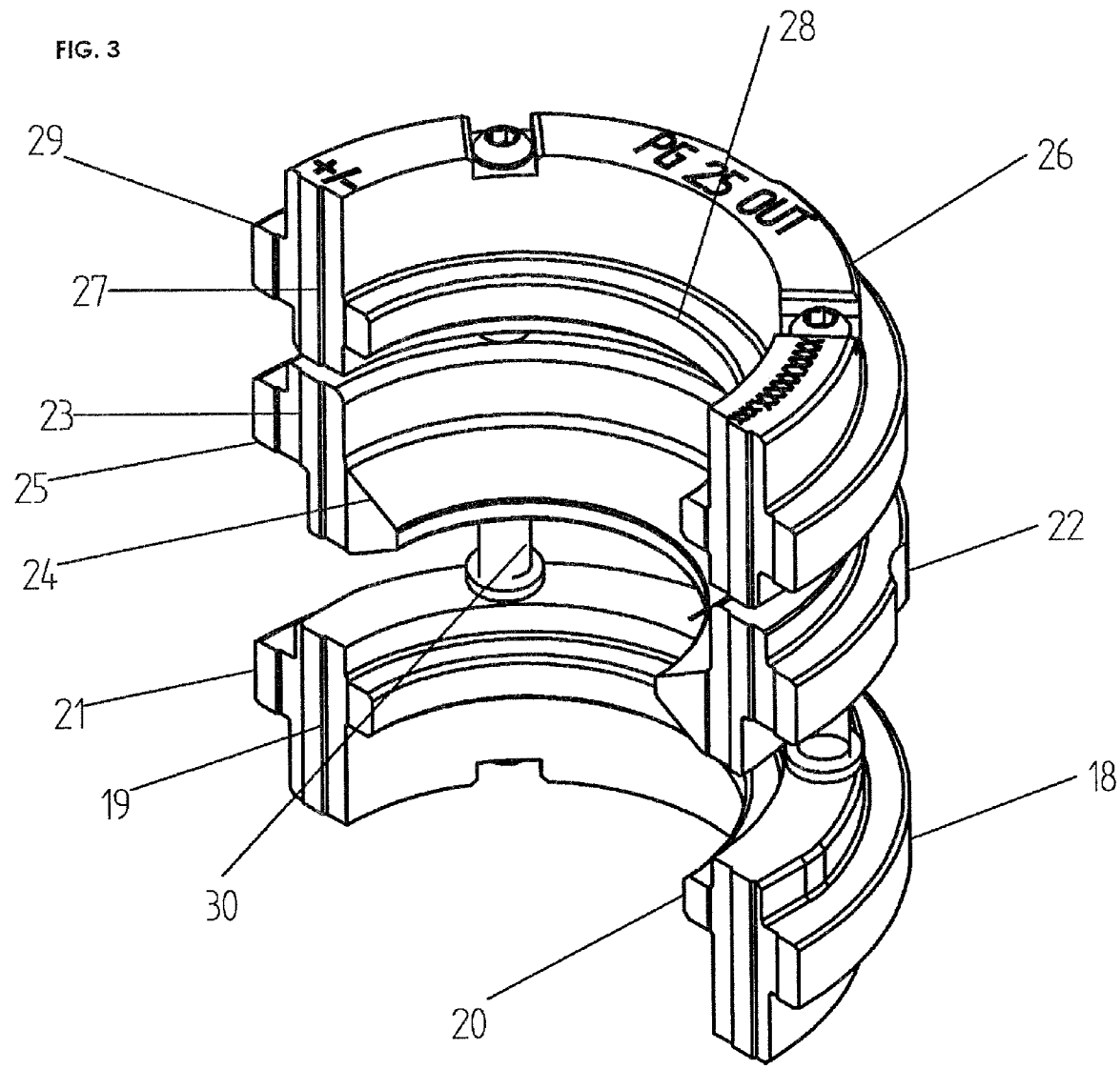
FIG. 3 shows a perspective diagram of a preferred embodiment of an insert, partly in section

FIG. 3 shows an insert half on a larger scale. It consists of three parts which are to be designated here as ring halves because they give closed rings with the respective parts of the other insert half when they are inserted into the housing halves and the housing is closed. The lower ring half 18 consists of a cylindrical part 19, an engaging edge 20 running around the inner surface thereof and a rib 21 around the outer surface. Accordingly, the middle ring half 22 consists of a cylindrical part 23, an engaging edge 24 running around the inner surface thereof and a rib 25 running around the outer surface, and the upper ring half 26 consists of a cylindrical part 27, an engaging edge 28 running around the inner surface thereof and a rib 29 running around the outer surface.

The upper and the lower ring halves are connected to one another by bolts 30 the axial spacing being determined so that the two ribs running on their outsides engage the corresponding grooves of the lower part and of the cover when the insert is inserted into the housing. The middle ring half 22, guided by the bolts, is moveable axially between the upper and the lower ring half. In the inserted state, its outside rib 25 engages the groove 17 in the recess of the press plate half. Thus, when the press plate is displaced axially by the pressure cylinder, a corresponding axial displacement of the middle ring half 22 inevitably takes place.

For pressing tool holders of different size in and out, inserts having appropriate internal dimensions are provided. The external dimensions of the inserts having different internal sizes are always the same.

We claim:

1. Pressing device for relative axial displacement of two parts arranged coaxially with one another and displaceable towards one another only by means of high pressure, comprising a housing, a press plate displaceable axially in the interior of the housing, a number of pressure cylinders arranged in an annular manner at equal angular spacings and intended for axial displacement of the press plate, an insert having coaxial annular engaging edges for engaging the parts to be pressed, characterized in that the insert consists of two half-shells which when assembled form a substantially cylindrical shape and which in turn consist of three ring halves, on the insides of which said engaging edges are formed and the outsides of which are provided with all-round ribs which engage annular grooves on the housing and on the press plate.

2. Pressing device according to claim 1, characterized in that pairs of insert halves of different size are provided for pressing parts of different size.

* * * * *